United States Patent
Caretti et al.

(10) Patent No.: US 9,622,150 B2
(45) Date of Patent: Apr. 11, 2017

(54) HETEROGENEOUS CELLULAR NETWORKS

(71) Applicant: TELECOM ITALIA S.p.A., Milan (IT)

(72) Inventors: Marco Caretti, Turin (IT); Gian Michele Dell'Aera, Turin (IT); Maurizio Fodrini, Turin (IT); Bruno Melis, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 100 days.

(21) Appl. No.: 14/758,087

(22) PCT Filed: Dec. 28, 2012

(86) PCT No.: PCT/EP2012/077076
§ 371 (c)(1),
(2) Date: Jun. 26, 2015

(87) PCT Pub. No.: WO2014/101958
PCT Pub. Date: Jul. 3, 2014

(65) Prior Publication Data
US 2015/0334635 A1    Nov. 19, 2015

(51) Int. Cl.
*H04W 48/08*    (2009.01)
*H04W 8/22*    (2009.01)
(Continued)

(52) U.S. Cl.
CPC ......... *H04W 48/08* (2013.01); *H04L 27/2601* (2013.01); *H04W 8/22* (2013.01);
(Continued)

(58) Field of Classification Search
CPC .. H04L 41/12; H04L 27/2601; H04W 52/244; H04W 40/244; H04W 28/08;
(Continued)

(56) References Cited

U.S. PATENT DOCUMENTS

| 2011/0190022 A1 | 8/2011 | Rudrapatna |
| 2013/0114488 A1 | 5/2013 | Fang et al. |

(Continued)

FOREIGN PATENT DOCUMENTS

| WO | WO 2011/094081 A1 | 8/2011 |
| WO | WO 2012/136168 A1 | 10/2012 |

OTHER PUBLICATIONS

International Search Report and Written Opinion of the International Searching Authority issued Sep. 26, 2013, in PCT/EP2012/077076, filed Dec. 28, 2012.

*Primary Examiner* — Benjamin H Elliott, IV
(74) *Attorney, Agent, or Firm* — Oblon, McClelland, Maier & Neustadt, L.L.P.

(57) ABSTRACT

A wireless communication network including a first transceiver station for transmitting first signals over a first area coverage and over a first transmission bandwidth, and a second transceiver station selectively activatable/de-activatable. The second transceiver station is operable to broadcast, when de-activated, a beacon signal identifying the second transceiver station, the beacon signal having a beacon frequency at edges of the first transmission bandwidth. The beacon signal is detectable by a user equipment for inferring presence of the second transceiver station. The first transceiver station is configured to receive a response signal from a user equipment based on the detected beacon signal, and to schedule activation of the second transceiver station based on the received response signal.

17 Claims, 3 Drawing Sheets

Figure 1:
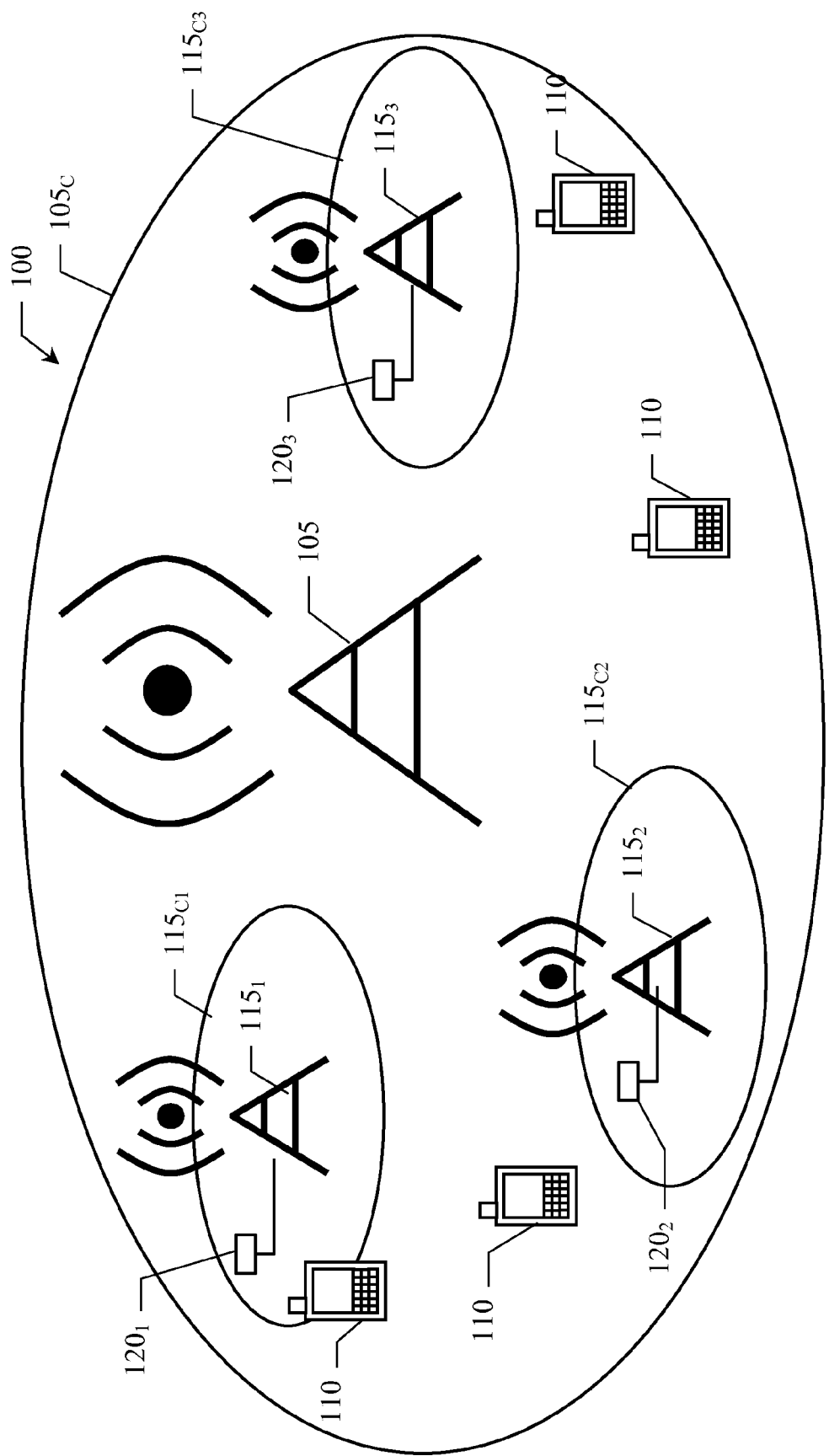

(51) Int. Cl.
*H04W 72/04* (2009.01)
*H04L 27/26* (2006.01)
*H04W 48/10* (2009.01)
*H04W 52/02* (2009.01)
*H04W 84/04* (2009.01)

(52) U.S. Cl.
CPC ....... *H04W 48/10* (2013.01); *H04W 52/0206* (2013.01); *H04W 72/04* (2013.01); *H04W 84/045* (2013.01)

(58) Field of Classification Search
CPC . H04W 28/12; H04W 36/0005; H04W 48/08; H04W 8/22; H04W 72/04; H04W 92/02; H04W 92/10; H04W 92/20
See application file for complete search history.

(56) References Cited

U.S. PATENT DOCUMENTS

| | | | |
|---|---|---|---|
| 2014/0080488 A1* | 3/2014 | Michel | H04W 52/0206 455/436 |
| 2015/0181603 A1* | 6/2015 | Wakabayashi | H04L 5/0041 370/329 |
| 2015/0200758 A1* | 7/2015 | Wakabayashi | H04L 5/0041 370/329 |
| 2015/0280953 A1* | 10/2015 | Porat | H04L 27/2602 370/330 |
| 2015/0334635 A1* | 11/2015 | Caretti | H04W 48/10 370/335 |

* cited by examiner

HETEROGENEOUS CELLULAR NETWORKS

BACKGROUND OF THE INVENTION

Field of the Invention

The present invention generally relates to wireless communication networks, such as cellular networks. More particularly, the present invention relates to cellular networks based on OFDM access schemes (such as LTE/LTE-Advanced technology, WiMAX, WiFi and their evolutions) or CDMA access schemes, and to a method for efficiently and dynamically managing activation and deactivation of (e.g., small) nodes within such cellular networks.

Overview of the Related Art

Evolution of cellular networks has experimented a significant growth in terms of spread and performance, and has recently brought to 3GPP LTE ("Third Generation Partnership Project Long Term Evolution")/LTE-Advanced standard.

3GPP LTE/LTE-Advanced standard is conceived for allowing data to be high-speed conveyed between a fixed-location transceiver base station or node (e.g., eNodeB) radiating radio waves over a respective land area (cell) and user equipments (e.g., user terminals, such as cellular phones) within the cell.

In order to optimize cellular networks performance (especially for unequal user equipments or data traffic distribution), 3GPP LTE/LTE-Advanced standardization activities have been addressed to heterogeneous scenarios - i.e. comprising both relatively high-power and wide-coverage nodes (or macro nodes), identifying so-called macro cells, and a number of lower-power, smaller-coverage nodes (or small nodes, e.g. micro, pico, femto nodes) identifying small cells within the macro cell for enhancing overall coverage and capacity thereby facilitating communication between user equipments within a macro cell and the pertaining macro node.

However, due to the growing number of mobile network users and to the growing demand for services requiring very high data traffic (such as multimedia and real-time services) and very limiting "Quality of Service", multiple small nodes are typically deployed within each macro cell, in indoor and outdoor locations and anywhere high capacity is needed.

Thus, compared to traditional homogeneous cellular networks, which are based on macro nodes of comparable power and coverage, in heterogeneous cellular networks high density small nodes may also be deployed without full planning or even in entirely uncoordinated manner.

This can sharpen interference management and power consumption issues.

Interference may arise between the macro cell and the small cells, as well as between the small cells themselves.

In order to better manage the network capacity and performance, to reduce interference and optimize power consumption, scientific research (e.g., the standardization bodies like 3GPP) is considering to manage activation and deactivation of each small node according to traffic load (e.g., amount of data traffic and number of users equipments within the corresponding small cell).

Broadly speaking, small nodes can be activated for providing additional capacity, and deactivated when such additional capacity is no longer needed hence reducing power consumption—with such activation and/or deactivation that can be scheduled by the macro node or by the small nodes themselves.

In the state of the art, solutions are known aimed at controlling small nodes activation and deactivation.

EP 2512171 discloses a method for managing the state of micro nodes within a cellular network. The cellular network comprises a macro node containing a tracking area that covers micro cells (each one associated with a micro node). The method comprises activating the micro nodes within the tracking area, determining the number of user equipments in idle mode within the tracking area, and deactivating one or more micro nodes within the tracking area when the number of user equipments in idle mode is lower than a predetermined value. The method further comprises activating all the micro nodes within the tracking area if current load of the macro cell exceeds another predetermined value.

WO 2012/055984 discloses a cellular network comprising macro and small nodes, and a method for activating small nodes. The method comprises determining a current operational mode of a small node, switching the small node from inactive to more active operational modes upon fulfillment of predefined criteria (e.g., distance between user equipment and small node) and, according to current operational mode thereof, transmitting a corresponding switching signal from the macro node to the small node.

WO 2012/110075 discloses nodes wake-up control in heterogeneous network. For each node, average uplink interference, path-loss between node and neighboring nodes, and wake-up threshold interference of the neighboring nodes are retrieved for evaluating a wake-up condition. If the wake-up condition is satisfied, the node is switched from inactive (transmitter switched-off) to active (transmitter switched-on) states.

SUMMARY OF INVENTION

The Applicant has recognized that neither the solutions currently defined in 3GPP LTE/LTE-Advanced standard, nor those of the cited prior arts are satisfactory.

In fact, such solutions, being substantially based on traffic load detection/monitoring/measurement, require excessive processing times, thus they are not adapted to be used in medium/high data traffic speed scenarios.

Moreover, as activation of the small nodes is advertised by the macro node, only offloading based on traffic load is considered, whilst offloading based on service and subscriber profile cannot be managed.

Last but not least, such solutions are not adapted to manage extremely dynamic conditions caused by high density of small nodes and moving users, due to latencies (e.g., caused by long processing times) that are instead tolerable in quasi-static scenarios.

In view of the above, the Applicant has tackled the problem of efficiently and dynamically managing activation and deactivation (and reducing power consumption) of multiple (e.g., small) nodes within a heterogeneous cellular network, and, in order to achieve that, has devised a solution aimed at simple and quick small nodes detection and identification.

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, one aspect of the solution according to one or more embodiments of the present invention relates to a wireless communication network comprising a first transceiver station for transmitting first signals over a first area coverage and over a first transmission bandwidth, and a selectively activatable/de-activatable second transceiver station. The second transceiver station is operable to broadcast, when de-activated, a beacon signal identifying the second transceiver station, the beacon signal having a beacon frequency at the edges of the first transmission bandwidth. The beacon signal is detectable by a user equipment for inferring the presence of the second transceiver station. The first transceiver station is configured to receive a response signal from a user equipment based on the detected beacon signal, and to schedule the activation of the second transceiver station based on the received response signal.

According to an embodiment of the present invention, the wireless communication network is a cellular network making use of an OFDMA access scheme, such as a cellular network based on LTE/LTE-Advanced, WiMAX or WiFi technology.

According to an embodiment of the present invention, the beacon signal is mapped on a resource element pattern comprising a pre-defined combination of OFDM symbols and sub-carrier, the resource element pattern being statically configurable by a service provider through the first transceiver station, or dynamically assignable by means of Self Organizing Network algorithms.

According to an embodiment of the present invention, the resource element pattern is repeated on multiple transmission time intervals for improving detection accuracy from the user equipment.

According to an embodiment of the present invention, the response signal comprises the detected beacon signal mirrored by using said resource element pattern.

According to an embodiment of the present invention, the resource element pattern associated with the second transceiver station is orthogonal with respect to the resource element pattern of any other second transceiver station within the first area coverage for avoiding overlapping in both frequency and time domain.

According to an embodiment of the present invention, the beacon signal comprises a sequence of bits encoding information for second transceiver station identification, the same resource element pattern being associated with the second transceiver station and with any other second transceiver station within the first area coverage, the second transceiver station being further configured to apply scrambling and/or spreading codes for minimizing interference among the second transceiver stations and allowing each user equipment to detect each second transceiver station separately in case of beacon signals collisions.

According to an embodiment of the present invention, the response signal comprises said sequence of bits and an additional sequence of bits identifying the user equipment that is transmitting the response signal.

According to an embodiment of the present invention, the second transceiver station is configured to transmit second signals at a second transmission power and over a second transmission bandwidth different from the first transmission bandwidth, the beacon signal being transmitted at a beacon transmission power different from the second transmission power and such to compensate channel attenuation unbalance between the beacon signal and the second signals.

According to an embodiment of the present invention, the beacon transmission power is higher than the second transmission power for allowing the user equipment to infer the presence of the second transceiver station before entering a second area coverage of said second transceiver station.

According to an embodiment of the present invention, the second area coverage is at least partially within and smaller than the first area coverage.

According to an embodiment of the present invention, the beacon frequency comprises one between un-modulated sub-carriers frequencies within a guard interval associated with the first transmission bandwidth.

According to an embodiment of the present invention, the second transceiver station is configured to transmit second signals over a second transmission bandwidth comprising at least part of the first transmission bandwidth, the beacon frequency being one between un-modulated sub-carriers frequencies at the edge of the second transmission bandwidth outside the first transmission bandwidth.

According to an embodiment of the present invention, the first transceiver station is configured to communicate activation of the second transceiver station over a dedicated, for example X2, interface.

According to an embodiment of the present invention, the wireless communication network is a cellular network making use of a CDMA access scheme, such as a cellular network based on UMTS and CDMA2000 technology, the beacon signal being an OFDMA signal and the beacon frequency being within a transition bandwidth associated with the first transmission bandwidth.

Another aspect of the solution according to one or more embodiments of the present invention relates to a user equipment for use in such wireless communication network. The user equipment is configured to selectively detect the beacon signal for inferring the presence of the second transceiver station, and transmit the response signal based on the detected beacon signal.

A further aspect of the solution according to one or more embodiments of the present invention relates to a method for operating a wireless communication network comprising a first transceiver station for transmitting first signals over a first transmission bandwidth, and a selectively activatable/de-activatable second transceiver station. The method comprises:

at the second transceiver station, broadcasting, when de-activated, a beacon signal identifying the second transceiver station, the beacon signal having a beacon frequency at the edges of the first transmission bandwidth, at a user equipment, detecting the beacon signal for inferring the presence of the second transceiver station, and at the first transceiver station, receiving a response signal from the user equipment based on the detected beacon signal, and scheduling the activation of the second transceiver station based on the received response signal.

The proposed solution allows a user equipment to quickly and easily detect and identify a small cell (that can potentially serve it) within the macro cell. The proposed solution, as requiring low processing times, is adapted to be used in highly dynamic heterogeneous scenarios having medium/high data traffic speed scenarios and very high small cells densities.

Moreover, the proposed solution allows scheduling activation of a certain small node by taking into account parameters such as required services and subscriber profiles.

BRIEF DESCRIPTION OF THE ANNEXED DRAWINGS

Figure 2:
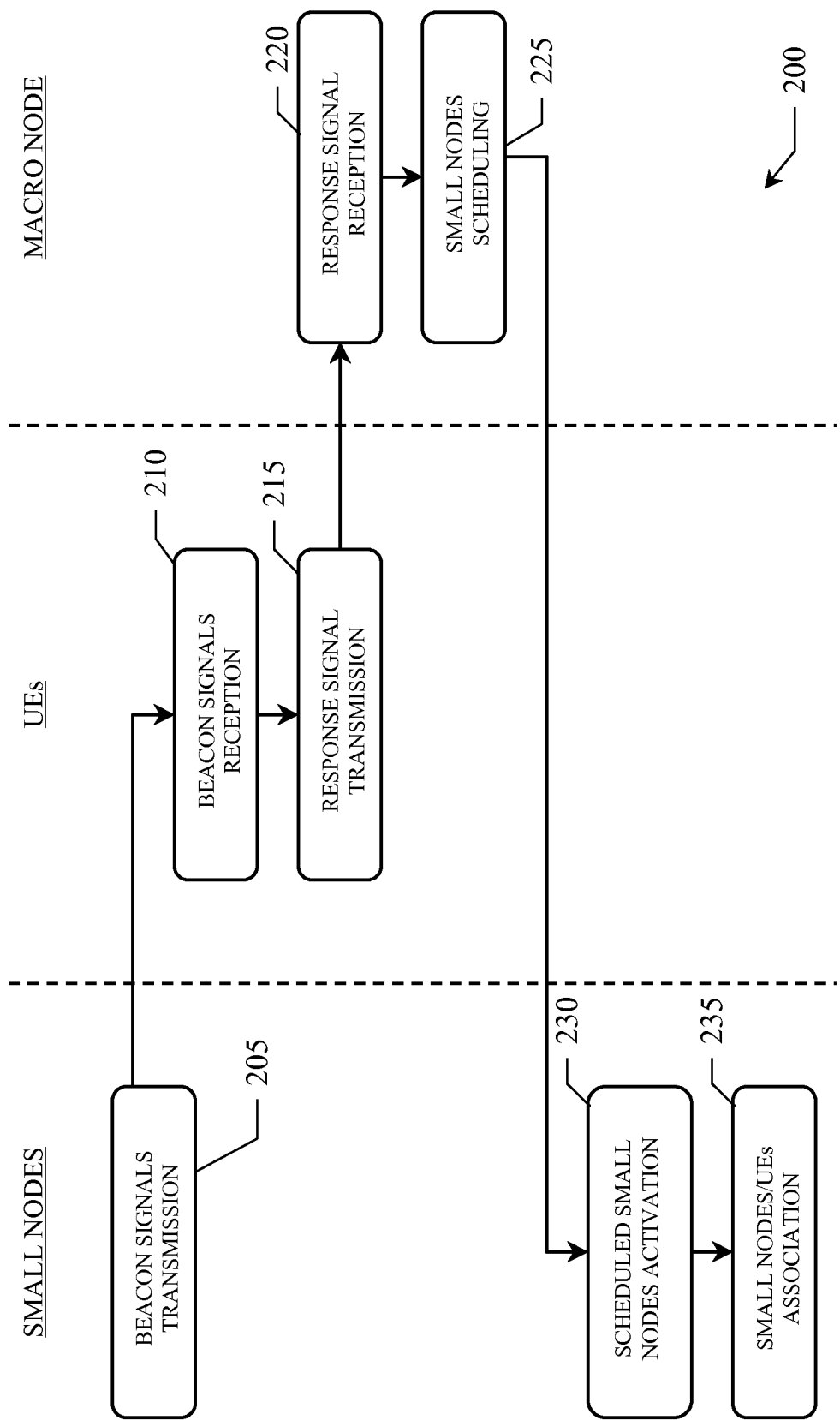
Figure 3:
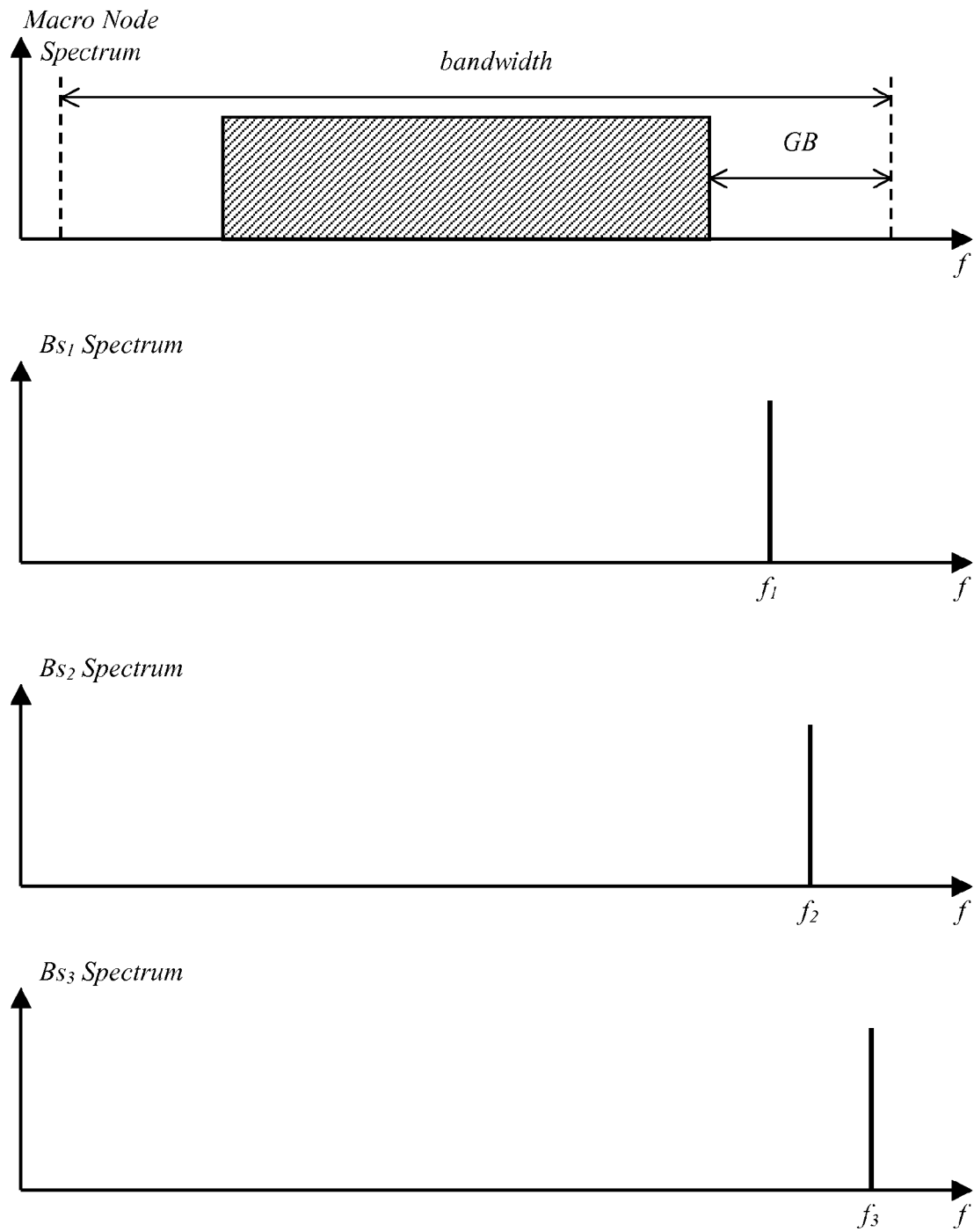

These and other features and advantages of the present invention will be made apparent by the following description of some exemplary and non limitative embodiments thereof; for its better intelligibility, the following description should be read making reference to the attached drawings, wherein:

FIG. 1 schematically shows a heterogeneous cellular network according to an embodiment of the present invention;

FIG. 2 schematically shows a swim lane flow chart illustrating a sequence of operations of the cellular network of FIG. 1 from small nodes, user equipments and macro node sides, according to an embodiment of the present invention, and FIG. 3 shows, in the frequency domain, macro node downlink OFDM signal spectrum and small nodes beacon signals spectra according to an embodiment of the present invention.

DETAILED DESCRIPTION OF PREFERRED EMBODIMENTS OF THE INVENTION

With reference to the drawings, a cellular network 100 according to an embodiment of the present invention is schematically illustrated in FIG. 1. The cellular network 100 (e.g., compliant with the 3GPP LTE/LTE-Advanced standard) comprises a plurality (only one depicted in the figure) of relatively high-power and wide coverage transceiver stations (or macro nodes) 105. Each macro node 105 is configured to provide radio coverage over a relatively wide geographic area, also referred to as macro cell $105_C$, for allowing User Equipments (UEs) 110 (e.g., mobile phones) within the macro cell $105_C$ to exchange data traffic (e.g., web browsing, e-mailing, voice, or multimedia data traffic).

As visible in the figure, the cellular network 100 also comprises a number N of lower-power, smaller coverage nodes (e.g., pico, micro, and/or femto nodes), or small nodes $115_i$ (i=1,2, ... N, with N=3 in the example at issue), each one identifying a respective small cell $115_{Ci}$ for increasing cellular network capacity. Although each small cell $115_{Ci}$ has been exemplarily illustrated completely within the macro cell $105_C$, this should not be construed limitatively. In fact, the principles of the present also apply to scenarios featuring one or more (all, as a limit case) small cells $115_{Ci}$ partially within the macro cell $105_C$ (e.g., in case of cellular network comprising multiple macro nodes, between two or more adjacent macro cells), or even completely outside the macro cell $105_C$ (e.g., in case that provision of one or more additional macro nodes, not shown, makes macro cell $105_C$ smaller than it originally was). For such reason, small cells $115_{Ci}$ illustrated as comprised within the macro cell $105_C$ are to be understood as small nodes $115_i$ pertaining to (i.e., handled by) the macro node 105.

For the sake of completeness, as well known by those having ordinary skill in the art, the macro nodes, such as the macro node 105, and the small nodes, such as the small nodes 115, form the radio access network; in turn, the radio access network is generally communicably coupled with one or more core networks (not shown), which may be coupled with other networks, such as Internet and/or public switched telephone networks (not illustrated).

As known, downlink transmission in 3GPP LTE/LTE-Advanced standard is based on Orthogonal Frequency Division Multiple Access (OFDMA) scheme, where radio resources are allocated in time/frequency domain. In time domain, radio resources are distributed every Transmission Time Interval (TTI), each one lasting 1 ms and comprising two time slots of 0.5 ms, whereas in frequency domain the whole bandwidth is divided into a plurality of 180-kHz sub-channels (each one corresponding to 12 adjacent and equally spaced sub-carriers). A radio resource comprising a certain number of OFDM symbols (e.g., seven) spanning over one time slot in time domain and twelve adjacent sub-carriers in frequency domain is referred to as PRB ("Physical Resource Block"), and corresponds to the smallest radio resource that can be allocated to a UE for data transmission. Each PRB comprises twelve sub-carriers spaced in frequency by 15 kHz over one OFDM symbol (each sub-carrier is referred to as Resource Element, or RE)—the total number of sub-carriers is therefore 12*7=84 REs for each PRB.

Broadly speaking, the cellular network 100 (i.e., the macro node 105, the UEs 110, and the small nodes $115_i$) is configured to allow easy and quick small nodes $115_i$ (and hence small cells $115_{Ci}$) detection by each UE 110 that can be potentially served by (one or more of) them, small nodes $115_i$ activation (if not activated already), and small nodes $115_i$/UE(s) 110 association for allowing proper data traffic exchange. Hereinafter, reference will be also made to FIG. 2, which schematically shows a swim lane flow chart 200 illustrating operation of the cellular network 100 from small nodes 115, UEs 110, and macro node 105 sides, according to an embodiment of the present invention.

Each small node $115_i$ is configured to repeatedly transmit (in downlink) a low power radio signal, hereinafter beacon signal $Bs_i$, univocally identifying the small node $115_i$—step 205. Generation and transmission of the beacon signals $Bs_i$ is advantageously achieved by means of low power equipments or modules $120_i$ (hereinafter, beacon modules) $120_i$ that can be different from those being used for generating and transmitting small nodes $115_i$ downlink OFDM signals (and properly synchronized with macro node 105 downlink OFDM signal). This is conceptually shown in FIG. 1, where the beacon modules $120_1, 120_2, 120_3$ (providing the beacon signals $Bs_1, Bs_2, Bs_3$) are illustrated separated from the small nodes $115_1, 115_2, 115_3$. Due to beacon modules $120_i$ structural independence, no substantial changes to small nodes $115_i$ are required for implementing the present invention in already existing cellular networks.

The beacon modules $120_i$ are powered (and hence operated) independently from the small nodes $115_i$, so that the corresponding beacon signals $Bs_i$ are broadcast regardless from small nodes $115_i$ current (active or inactive) status.

According to a particularly advantageous embodiment, small nodes $115_i$ are normally inactive, and are activated only when required. Thus, the cellular network 100 features low power consumption (indeed, beacon modules $120_i$ power consumption is substantially negligible, and does not significantly impact on overall power consumption of the cellular network 100).

As discussed above, the beacon signals $Bs_i$ are mainly intended to allow easy and quick small nodes $115_i$ (and hence small cells $115_{Ci}$) detection by each UE 110 that can be potentially served by (one or more of) them. However, the beacon signals $Bs_i$ can be also received by the other small nodes $115_i$ (e.g., equipped with suitable receiving arrangements). Reception of the beacon signals $Bs_i$ by the small nodes $115_i$ can be used for small nodes $115_i$ synchronizations, configuration and/or auto-configuration purposes, and for any other procedure involving interactions among multiple small nodes $115_i$. For example, upon beacon signals $Bs_i$ detection, each small node $115_i$ can directly activate the small nodes $115_i$ related to the detected beacon signals $Bs_i$. Alternatively, activation can be performed through the macro node 105 (in which case, the small node $115_i$ detecting the beacon signals $Bs_i$ can perform the same steps as, and described below for, a UE 110 detecting the same beacon signals $Bs_i$).

As visible from FIG. 3, which shows (in the frequency domain) macro node 105 downlink OFDM signal spectrum and beacon signals $Bs_i$ spectra according to an embodiment of the present invention, each beacon signal $Bs_i$ is transmitted on a respective frequency (hereinafter, beacon frequency) $f_i$. Each beacon frequency $f_i$ is one (subset) of the un-modulated (unused) sub-carriers at the edges of the transmission bandwidth of the macro node 105 that (in 3GPP LTE/LTE-Advanced standard) identify the guard band GB against interference caused on adjacent carriers.

In order to limit the impact of the beacon signal $Bs_i$ on out-of-band emissions (usually expressed in terms of Adjacent Channel Leakage Ratio and typically resulting from modulation process and non-linearity in the transmitter), time duration of the beacon signal $Bs_i$ is preferably kept short.

Each beacon signal $Bs_i$ is mapped on a pre-defined combination of OFDM symbols and sub-carrier (RE pattern)— with such RE pattern that can be statically configured by the service provider (e.g., through signaling or O&M functions from the macro node 105 or any other suitable entity of the cellular network 100), or dynamically assigned by means of SON ("Self Organizing Network") algorithms (e.g., in scenarios with very high densities of small nodes $115_i$). In addition, for improving detection accuracy from the UEs 110, each beacon signal can be repeated on multiple TTIs (e.g., for improving detection accuracy from the UEs 110). Thus, time pattern selection and beacon signal duration may be seen as a compromise between the limits on out of band emissions and detection accuracy from the UEs 110.

The beacon signal $Bs_i$ can be a simple on/off signal, or an information bearing signal—e.g., the latter comprising sequences of bits encoding information for small node $115_i$ identification (e.g., small node $115_i$ ID). In the first case, the RE patterns associated with different small nodes $115_i$ within the same macro cell $105_C$ should be reciprocally orthogonal (so as to avoid overlapping in both frequency and time domain and allow small nodes $115_i$ identification). In the second case, a same RE pattern can instead be assigned to different small nodes $115_i$, and scrambling and/or spreading codes (e.g., based on Wlash-Hadamard or Zadoff-Chu sequences) should be used to minimize interference among small nodes $115_i$ (thereby allowing each UE 110 to detect each small node $115_i$ separately in case of beacon signals $Bs_i$ collisions).

At step 210, when a UE 110 moving within the macro cell $105_C$ falls within or gets close to a (possible) small cell $115_{Ci}$, the UE 110 detects the corresponding beacon signal $Bs_i$ (e.g., through a corresponding receiver module, not shown). In case of on/off beacon signal $Bs_i$, detection is preferably achieved by making the receiver module in the UEs 110 responsive to power thresholds.

In scenarios where small nodes $115_i$ are used only to boost throughput of UEs 110 already connected to the macro node 105, beacon signal detection switch-on and switch-off can be properly (e.g., automatically) handled for reducing UE 110 battery consumption. By way of example, when a UE 110 is in idle mode (e.g., no data traffic to be exchanged or under exchange), (unnecessary) beacon signal $Bs_i$ detection is switched-off. On the other side, when a UE 110 is in connected mode (e.g., data traffic are to be exchanged or under exchange), beacon signal $Bs_i$ detection can be switched-on only if the UE 110 needs higher throughput than throughput currently provided by the macro node 105.

In order to allow the UE 110 to detect the presence of the small node $115_i$ in advance (i.e. when the UE 110 is close to small cell $115_{Ci}$, but is not falling within its coverage yet), the beacon module $120_i$ should transmit the beacon signal $Bs_i$ at a properly calibrated power (e.g., even slightly higher than small node $115_i$ downlink OFDM signal).

Beacon signal $Bs_i$ power calibration could also be necessary for coverage issues. For example, in case the macro node 105 and the small nodes $115_i$ are deployed on different frequency bands (e.g., 800 MHz and 2600 MHz, respectively), high coverage imbalance between the beacon signal $Bs_i$ (transmitted at a beacon frequency $f_i$ within macro node 110 bandwidth) and the downlink OFDM signal of active small nodes $115_i$ could occur, due to the very different channel attenuations. For such reason, beacon signals $Bs_i$ powers calibration should be envisaged for obtaining comparable coverage with respect to the downlink OFDM signals of the respective small nodes $115_i$.

Such power calibration is instead not necessary in case of co-channel scenarios or when the macro node 105 and the small nodes $115_i$ are deployed on same frequency bands. Co-channel scenario could instead prove critical in terms of interference, especially when small nodes $115_i$ bandwidth is larger than macro node 105 bandwidth. In such condition, in order to avoid co-channel interference occurring between the beacon signals $Bs_i$ transmitted on the un-modulated (unused) sub-carriers at the edges of the macro node 105 bandwidth and the active small nodes $115_i$ downlink OFDM signals (using same or close sub-carriers), it is possible to allocate the beacon signals $Bs_i$ transmission on the unused sub-carriers of the small nodes $115_i$ downlink OFDM signals—in other words, when macro node 105 and small nodes 115 bandwidths overlap, the beacon signals $Bs_i$ can be transmitted on the un-modulated (unused) sub-carriers at the edges of the bandwidth being larger (and outside the bandwidth being smaller). In such case, the macro node 105 should signal such configuration to the UEs 110 (step not shown), so that they can use a FFT window having extended size (e.g., at least equal to the FFT window size used by the small nodes $115_i$), thus allowing beacon signals $Bs_i$ detection together with the macro node 105 downlink OFDM signal demodulation.

Upon detection of the beacon signal $Bs_i$, each UE 110 transmits to the macro node 105 (step 215) a corresponding response signal comprising the RE pattern and (if provided, such as when an information beacon signal $Bs_i$ is considered) the associated information content, and the macro node 105 receives such response signal—step 220.

Transmission of the response signal can be achieved by taking into account trade-off specifications between complexity and impact on the standard.

By way of example, the response signal can be transmitted by mirroring (in uplink) the received beacon signal $Bs_i$ by using the same RE pattern of the downlink.

In case of on/off beacon signals $Bs_i$, the macro node 105 will receive the sum of the response signals transmitted by different UEs 110 under the coverage of the same small node $105_i$. Thanks to mirroring, the macro node 105 is allowed to know the number of UEs 110 under the coverage of the same small node $105_i$, assuming that the power level of the response signal is properly set (and known by the macro node 105) for each UE 110. In this respect, the macro node 105 itself can set the power level of the response signal for each UE 110, so that the number of UEs 110 can be estimated from the overall power of the received response signals by knowing response signal power level set for each UE 110.

If information beacon signals $Bs_i$ each one comprising a respective sequence of bits are instead considered, each UE 110 should transmit the same sequence encoded with an additional sequence that help the macro node 105 to distinguish and/or count the UEs 110 (that are transmitting the sequence associated to the same small node $115_i$) in case of collisions in the uplink. The number of UEs 110 that are within the same small cell $115_{Ci}$ can be exploited, as discussed below, to schedule whether activation of a small node $115_i$ is advantageous or not.

Alternatively, the response signal can be transmitted by extending the already existing feedback signaling on the uplink channels (e.g., PUSCH/PUCCH for 3GPP LTE/LTE Advanced standard) of the macro node 105.

Upon reception of the response signals, the macro node 105 schedules how many and which small nodes $115_i$ are to be activated (step 225). Such scheduling can be performed according to different criteria (not limiting for the present invention), such as number of UEs 110 detecting the same small nodes $115_i$, subscriber profiles, service requested by the UEs 110, and the like.

Thus, the macro node 105 activates the scheduled small nodes $115_i$ (if inactive)—step 230—and associates them to the respective UEs 110—step 235.

Activation and association communications between the macro node 105 and the small nodes $115_i$ can be sent over microwave links, cable interface (e.g., by extending the existing X2 interface or defining a dedicated new interface), or the LTE radio interface (e.g., extending messages and protocols already developed for the radio relays), whereas communication between the macro node 105 and the UEs 110 about location and configuration of the beacon signals $Bs_i$ could be supported with RRC signaling or using specific downlink control channels like the PBCH.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the wireless communication network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to wireless communication network based on the LTE/LTE-Advanced standard, it should be understood that it is not in the intentions of the Applicant to be limited to the implementation of any particular wireless communication system architecture or protocol. In this respect, it is also possible to provide that, with suitable simple modifications, the proposed method for dynamic activation of the small cells may be applied to any other wireless communication network based on generic access schemes, such as OFDMA (e.g., WiMAX and WiFi) or CDMA (e.g., UMTS and CDMA2000). In case of CDMA based systems it is necessary to transmit an OFDMA signal superimposed to the CDMA transmitted signal. The OFDMA signal, carrying the beacon signal, is generated by modulating only the sub-carriers located in the transition bandwidth of the CDMA signal—i.e., the portion of bandwidth at the edges of the assigned channel where, due to the effect of the transmission filters, the power spectral density decreases from a maximum value to a very low value (e.g., 40÷50 dB below the maximum value) for limiting interference on the adjacent channels.

In this way the mutual interference between the OFDMA signal carrying the beacon signal and the CDMA signal carrying user data is minimized.

The invention claimed is:

1. A wireless communication network comprising:
a first transceiver station for transmitting first signals over a first area coverage and over a first transmission bandwidth, and
a second transceiver station selectively activatable/de-activatable,
the second transceiver station is operable to broadcast, when de-activated, a beacon signal identifying the second transceiver station, the beacon signal having a beacon frequency at the edges of the first transmission bandwidth, and
the beacon signal is detectable by a user equipment for inferring the presence of the second transceiver station, and
the first transceiver station is configured to receive a response signal from a user equipment based on the detected beacon signal, and to schedule the activation of the second transceiver station based on the received response signal.

2. The wireless communication network according to claim 1, wherein the wireless communication network is a cellular network making use of an OFDMA access scheme, such as a cellular network based on LTE/LTE-Advanced, WiMAX or WiFi technology.

3. The wireless communication network according to claim 2, wherein the beacon signal is mapped on a resource element pattern comprising a pre-defined combination of OFDM symbols and sub-carrier, the resource element pattern being statically configurable by a service provider through the first transceiver station, or dynamically assignable by means of Self Organizing Network algorithms.

4. The wireless communication network according to claim 3, wherein the resource element pattern is repeated on multiple transmission time intervals for improving detection accuracy from the user equipment.

5. The wireless communication network according to claim 3, wherein the response signal comprises the detected beacon signal mirrored by using said resource element pattern.

6. The wireless communication network according to claim 3, wherein the resource element pattern associated with the second transceiver station is orthogonal with respect to the resource element pattern of any other second transceiver station within the first area coverage for avoiding overlapping in both frequency and time domain.

7. The wireless communication network according to claim 3, wherein the beacon signal comprises a sequence of bits encoding information for second transceiver station identification, the same resource element pattern being associated with the second transceiver station and with any other second transceiver station within the first area coverage, the second transceiver station being further configured to apply scrambling and/or spreading codes for minimizing interference among the second transceiver stations and allowing each user equipment to detect each second transceiver station separately in case of beacon signals collisions.

8. The wireless communication network according to claim 7, wherein the response signal comprises said sequence of bits and an additional sequence of bits identifying the user equipment that is transmitting the response signal.

9. The wireless communication network according to claim 1, wherein the second transceiver station is configured to transmit second signals at a second transmission power and over a second transmission bandwidth different from the first transmission bandwidth, the beacon signal being transmitted at a beacon transmission power different from the second transmission power and such to compensate channel attenuation unbalance between the beacon signal and the second signals.

10. The wireless communication network according to claim 9, wherein the beacon transmission power is higher than the second transmission power for allowing the user equipment to infer the presence of the second transceiver station before entering a second area coverage of said second transceiver station.

11. The wireless communication network according to claim 10, wherein the second area coverage is at least partially within and smaller than the first area coverage.

12. The wireless communication network according to claim 2, wherein the beacon frequency comprises one between un-modulated sub-carriers frequencies within a guard interval associated with the first transmission bandwidth.

13. The wireless communication network according to claim 1, wherein the second transceiver station is configured to transmit second signals over a second transmission bandwidth comprising at least part of the first transmission bandwidth, the beacon frequency being one between un-modulated sub-carriers frequencies at the edge of the second transmission bandwidth outside the first transmission bandwidth.

14. The wireless communication network according to claim 2, wherein the first transceiver station is configured to communicate activation of the second transceiver station over a dedicated, for example X2, interface.

15. The wireless communication network according to claim 1, wherein the wireless communication network is a cellular network making use of a CDMA access scheme, such as a cellular network based on UMTS and CDMA2000 technology, the beacon signal being an OFDMA signal and the beacon frequency being within a transition bandwidth associated with the first transmission bandwidth.

16. User equipment for use in the wireless communication network according to claim 1, wherein the user equipment is configured to selectively detect the beacon signal for inferring the presence of the second transceiver station, and transmit the response signal based on the detected beacon signal.

17. Method for operating a wireless communication network comprising a first transceiver station for transmitting first signals over a first transmission bandwidth, and a second transceiver station selectively activatable/de-activatable, the method comprises:

at the second transceiver station, broadcasting, when de-activated, a beacon signal identifying the second transceiver station, the beacon signal having a beacon frequency at the edges of the first transmission bandwidth, at a user equipment, detecting the beacon signal for inferring the presence of the second transceiver station, and at the first transceiver station, receiving a response signal from the user equipment based on the detected beacon signal, and scheduling the activation of the second transceiver station based on the received response signal.

* * * * *